March 30, 1954     H. J. MURPHY     2,673,382
FASTENING DEVICE
Filed May 12, 1951
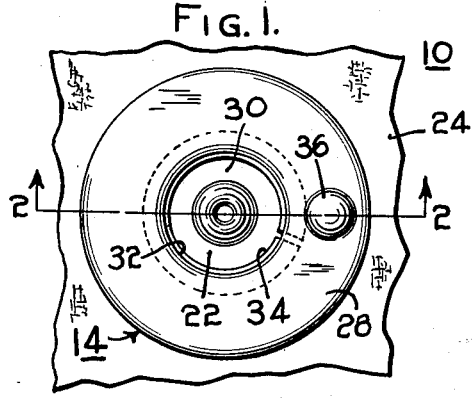
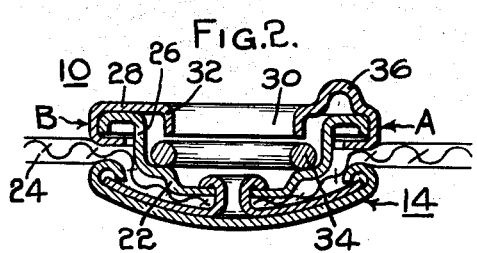
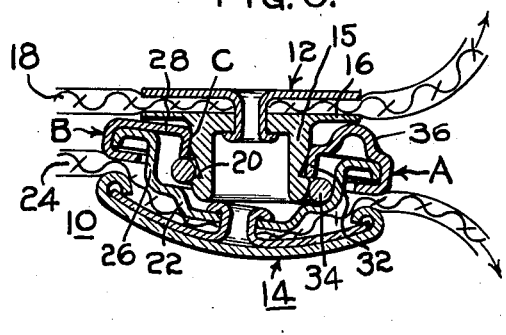
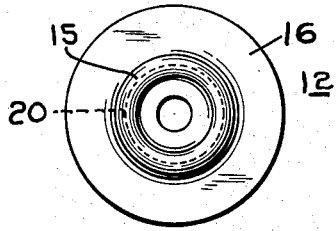
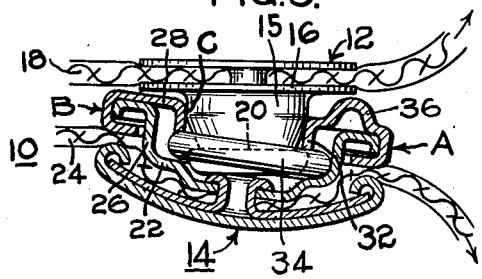
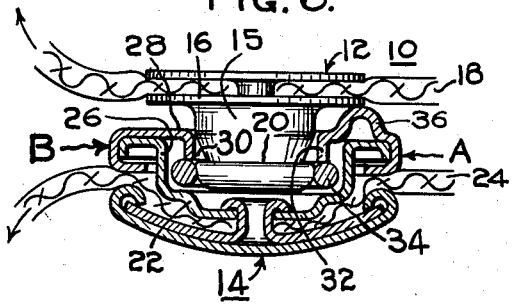
INVENTOR:
HOWARD J. MURPHY,
By Robert E Ross
AGENT.

Patented Mar. 30, 1954

2,673,382

UNITED STATES PATENT OFFICE 2,673,382

FASTENING DEVICE

Howard J. Murphy, Lynnfield, Mass., assignor to United-Carr Fastener Corporation, Cambridge, Mass., a corporation of Massachusetts Application May 12, 1951, Serial No. 226,020

1 Claim. (Cl. 24—218)

This invention relates generally to fastening devices, and has particular reference to snap fastener assembly and a socket member for use therein.

The object of the invention is to provide a snap fastener socket member which is adapted to engage a stud member in such a manner that the stud may be disengaged only by a separating force applied to a predetermined side of the assembly.

A further object of the invention is to provide a stud and socket assembly in which means is provided for maintaining the stud in a tilted position in the socket so that disengagement can be effected only by a separating force applied on the side of the assembly opposite said means.

A further object of the invention is to provide a socket member having an internal spring means for engaging an inserted shouldered stud in which a raised boss is provided on the socket on one side of the stud-receiving opening to bear against a portion of the inserted stud to maintain the stud in a tilted position in the socket so that the spring is not engaged behind the stud shoulder on the side adjacent the raised boss.

Other objects of the invention will, in part, be obvious, and will, in part, appear hereinafter.

In the drawing:

Fig. 1 is a plan view of the face of a socket member embodying the features of the invention;

Fig. 2 is a view in section taken on line 2—2 of Fig. 1;

Fig. 3 is a view in section of the socket member of Fig. 2 and an assembled stud member;

Fig. 4 is a top plan view of the stud member shown in Fig. 3;

Fig. 5 is a view of the assembly of Fig. 3 in which the stud-engaging spring is shown in elevation to illustrate the manner in which it engages the stud; and Fig. 6 is a view in section similar to Fig. 3 showing the action of the parts during disengagement of the stud.

Referring to the drawing, there is illustrated a three side lock snap fastener assembly 10, comprising a stud member 12 and a socket member 14 which are adapted for snapping engagement in such a manner that disengagement can be effected only by a separating force applied to a predetermined side of the assembly.

The stud 12 comprises generally a shank 15 having a flanged base 16 at one end for attachment to a supporting sheet 18, and a peripheral shoulder 20 near the other end which faces toward the flanged end.

The socket 14 comprises a hollow body formed by a base 22 for attachment to a supporting sheet 24, an upstanding peripheral wall 26 on the base, and a substantially flat annular socket face member 28 disposed on the wall 26. The annular member 28 extends radially inwardly from the walls and forms a stud-receiving opening 30. The portion of the annular member 28 adjacent the opening is turned downwardly toward the base 22 to form a depending lip 32 which terminates in spaced relation to the base 22. To provide means for engaging the stud, a split ring spring 34 is assembled in the socket between the base and the lip 32 to pass over the end of the inserted stud and seat behind the shoulder 20 thereon. The spring opening is smaller than the end of the stud so that circumferential expansion of the spring is required to allow the stud to pass therethrough. The spring is enclosed by the wall 26 with sufficient clearance therebetween to allow such expansion, but the distance between the wall and the lip is less than the diameter of the spring to prevent the spring from becoming unseated from its position between the base and the lip.

To provide means for imparting a three-side lock feature to the socket, a raised boss 36 is provided on the annular socket face 28 at one side of the stud-receiving opening 30. The boss 36 protrudes generally axially from the socket to bear against the flange 16 of an inserted stud for a purpose to be described hereinafter.

The stud is assembled into the socket in the usual manner, by inserting the end of the stud into the socket opening. However, during such assembly the stud flange 16 on the side of the assembly designated A comes up against the boss 36 and prevents any further entry of the stud on that side of the socket. However, the opposite side B of the stud is free to move further into the socket by pivoting about the boss 36 as a fulcrum so that the shoulder 20 on the side B of the stud can snap into engagement with the spring. The stud is thereby maintained in a tilted position in the socket so that the shoulder on the side A of the stud is disposed beneath the adjacent portion of the lip 32, and the spring is not engaged behind the stud shoulder on the side A (see Fig. 3). The spring is thereby canted in relation to the stud shoulder so that it extends from behind the stud shoulder on the side B around the stud and over the shoulder to be disposed above the shoulder on the side A. The relative dimensions of the parts are such that the spring is behind the shoulder for more than half of the circumference of the stud so that the stud will be retained in engagement with the spring (see Fig. 5).

With the stud maintained in this position, a separating force applied to the supporting sheets 18 and 24 on the side A of the assembly having the boss (see arrows on Fig. 3) will not disengage the stud from the socket, since the stud shoulder is seated behind the lip 32. However, a separating force applied to the supporting sheets on the opposite side of the assembly (see arrows on Fig. 6) will cause the stud to move out of the socket with the boss 36 providing a fulcrum about which the stud can pivot to allow the stud shoulder on the side B to pass out of engagement with the spring.

Although in the illustrated embodiment, the stud is provided with a relatively sharp shoulder, it will be appreciated that the shoulder may be rounded without impairing the three-side lock characteristic of the device. Although the sharp shoulder increases the locking strength of the fastener because the disengaging forces applied on side A are resisted by direct engagement of the sharp stud shoulder with the lip 32, the same locking action will be obtained if the shoulder is rounded, since such a separating force tends to tilt the stud further in the socket about the point of engagement of the stud on the opposite side with the adjacent inner edge of the annular portion 28, designated at C, and such further tilting would cause the end of the stud on side A to travel in an arc which intersects the depending lip on the side A.

Since in installations utilizing three-side lock snap fastener assemblies it is most convenient to determine the unlocking direction by the orientation of the socket, the raised boss which provides the unlocking action is provided on the socket. However, in some cases the raised boss may be provided on the flange of the stud instead of on the socket.

Since certain other obvious modifications may be made in the device without departing from the scope of the invention, it is intended that all matter contained herein be interpreted in an illustrative and not in a limiting sense.

I claim:

A three-side-lock snap fastener assembly, comprising a stud having a flanged base at one end and an abrupt circumferential shoulder disposed thereabout in spaced relation to the other end and to the base, said socket comprising a base for attachment to a supporting sheet, an upstanding peripheral wall on the base, a face portion extending inwardly from the wall and downwardly in spaced relation to the wall forming a depending lip terminating in spaced relation to the base, a circular spring disposed within the wall between the base and the depending lip, said face portion having a raised boss disposed thereon on one side, said stud being assembled into the socket with the flange of the stud bearing against the boss maintaining the stud tilted in the socket with the abrupt shoulder of the stud being disposed under the depending lip on the same side of the socket as the boss, and said spring being seated behind the abrupt shoulder on the side of the socket opposite the boss.

HOWARD J. MURPHY.

References Cited in the file of this patent
UNITED STATES PATENTS

| Number | Name | Date |
|---|---|---|
| 1,048,654 | Carr | Dec. 31, 1912 |
| 2,523,241 | Van Buren | Sept. 19, 1950 |